Nov. 3, 1970  J. E. CAMPBELL  3,537,931
PROCESS FOR BONDING PAPER AND A THERMOPLASTIC MATERIAL
EMPLOYING ELECTRICAL DISCHARGE
Filed Aug. 1, 1967  3 Sheets-Sheet 1
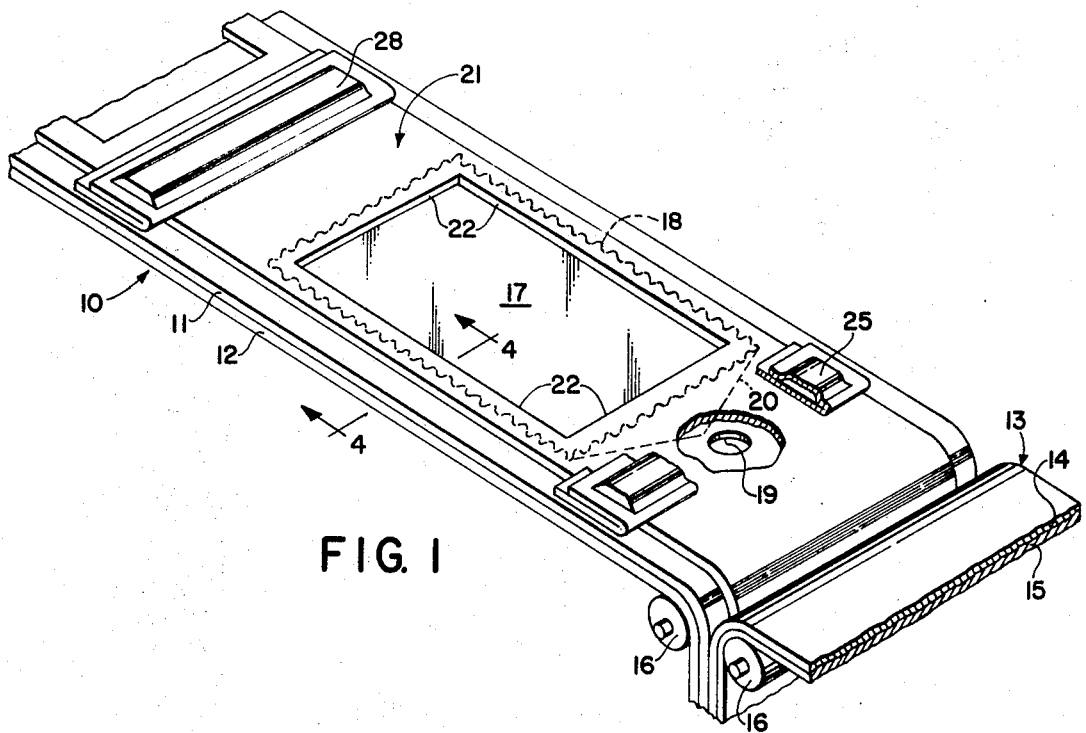
FIG. 1
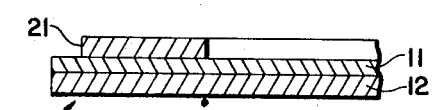
FIG. 4
FIG. 5
INVENTOR.
John E. Campbell
BY
Brown and Mikulka
and
Robert M. Ford
ATTORNEYS

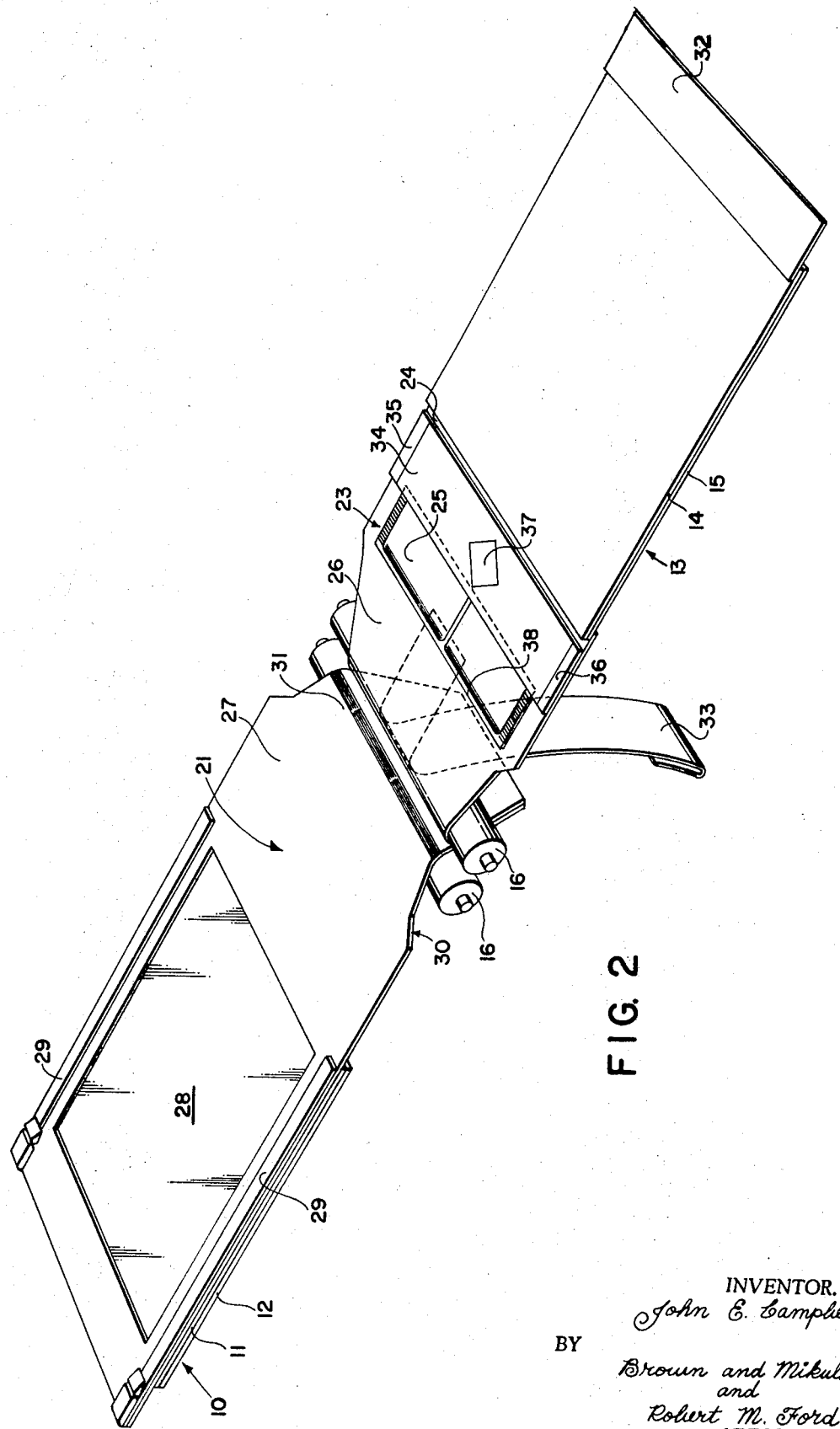

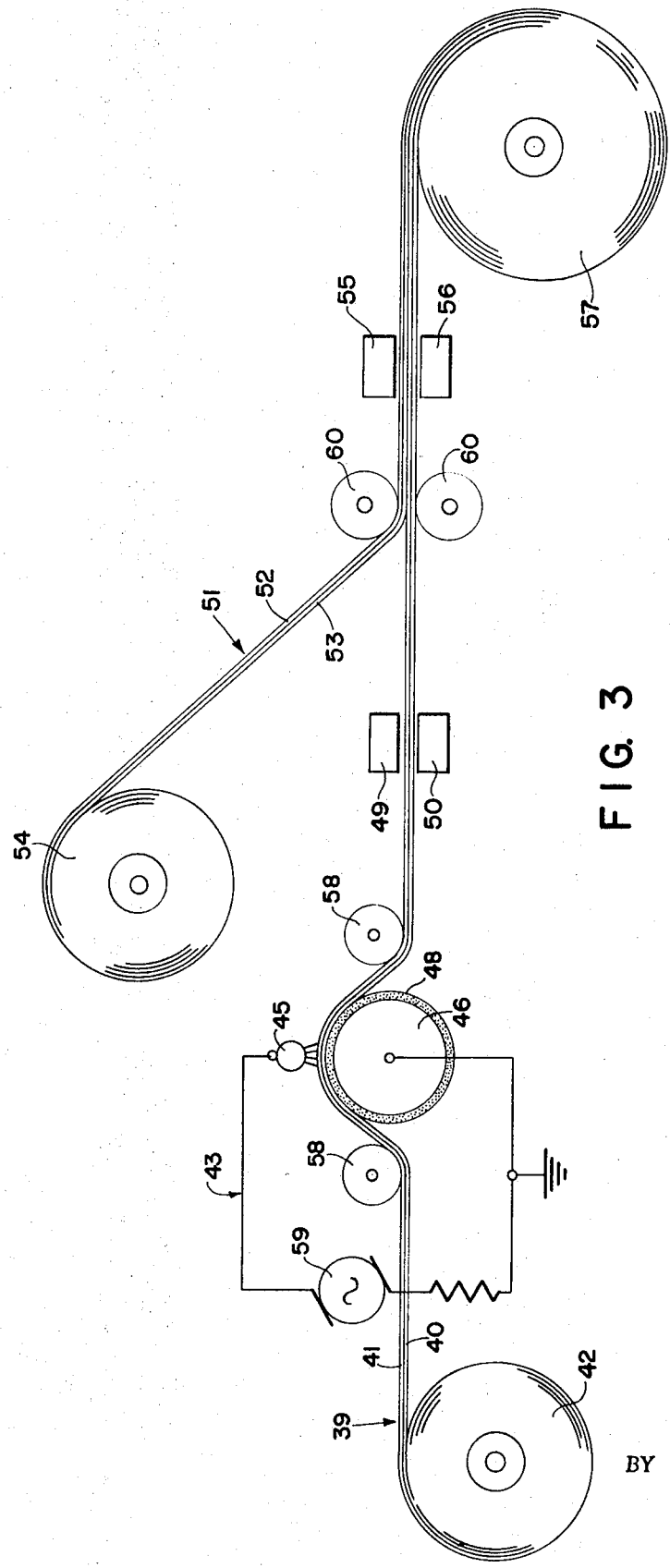

United States Patent Office 3,537,931
Patented Nov. 3, 1970

3,537,931
PROCESS FOR BONDING PAPER AND A THERMOPLASTIC MATERIAL EMPLOYING ELECTRICAL DISCHARGE
John E. Campbell, Needham, Mass., assignor to Polaroid Corporation, Cambridge, Mass., a corporation of Delaware
Filed Aug. 1, 1967, Ser. No. 657,549
Int. Cl. B29c *19/02*
U.S. Cl. 156—272                                                9 Claims

ABSTRACT OF THE DISCLOSURE

This invention relates to a process for the fabrication of a laminate which includes the steps of subjecting a first sheet element to an electrical discharge and thereafter thermally sealing said sheet element in superposed relationship to a second sheet element, at least one of said sheet elements carrying a thermoplastic material on the contact surface thereof.

---

Accordingly, the primary objects of the present invention are to provide a process particularly adapted for the fabrication of a laminate; to provide a process for the fabrication of a laminate comprising opposed flexible web materials; to provide a process for the fabrication of a laminate which includes subjecting at least one sheet element to an electrical discharge prior to thermal sealing of that sheet element in superposed relation to a second sheet element; to provide a process for the fabrication of a laminate which includes subjecting a thermoplastic material carried on at least one sheet element to an electrical discharge prior to thermal sealing of that sheet element to an opposed second sheet element; to provide sheet image-receptive material for receiving a photographic transfer image and having means thereon which frame the image and which are bonded to said image-receiving sheet; to provide framing means in the form of a mask which is temporarily secured to said image-receiving sheet; to provide a bond between said image-receiving sheet and said mask superposed thereon adapted to be released upon the application of pressure and/or moisture to said bond; to provide means for effecting said temporary adhesive apposition of a predeterminedly shaped mask to an appropriate image-receiving stratum; to provide means for effecting dissociation of said mask from interconnection with said image-receiving stratum; to provide suitable means of contacting said bond with an appropriate adhesive capacity decreasing liquid as, for example, a photographic processing composition, substantially concurrently with superposition of an exposed photosensitive element upon said image-receiving stratum, to provide release of said mask from said image-receiving stratum simultaneously with the dissociation of said image-receiving stratum from contact with said photo-sensitive element.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 1 is a diagrammatic perspective view of one embodiment of the invention and illustrates the use thereof in conjunction with photosensitive sheet material;

FIG. 2 is a diagrammatic perspective view of another embodiment of the invention, similar to FIG. 1, and illustrates the use thereof in conjunction with photosensitive sheet material;

FIG. 3 is a schematic side elevational view of an arrangement of components constituting apparatus particularly adapted to perform one embodiment of the process of the invention;

FIG. 4 is a diagrammatic exaggerated cross-sectional view along the line 4—4 of FIG. 1; and FIG. 5 is a diagrammatic exaggerated cross-sectional view, similar to FIG. 4, during production of a diffusion transfer image as detailed hereinafter.

As it is understood to the art, a photographic transfer process may be carried out to form in an image-receptive material an image in terms of a latent image contained in an exposed silver halide photosensitive sheet material. By one practice, a transfer process may be effected by spreading a viscous liquid composition between and in contact with an image-receiving layer or sheet and an exposed silver halide photosensitive layer which are arranged in superposed relation. By another practice, a transfer process may be effected by spreading a viscous liquid composition upon the peripheral surface of an exposed silver halide photosensitive layer which is superposed upon an image-receiving layer. The processing composition employed is one which is capable of developing a latent image in the photosensitive layer and of providing an imagewise distribution of image-forming components therein as a result of said development. These image-forming components are transferred in solution, and without appreciably disturbing said imagewise distribution, from the photosensitive layer to the image-receiving material to provide the desired transfer image.

In a practical embodiment of the invention, it is desirable to provide framing means in the form of a mask, preferably of a relatively thin flexible material, on the surface of the image-receiving sheet or film which is adapted to receive the transfer image. This mask is provided with an aperture to define the picture area on the image-receptive material while the portions of the mask which surround the aperture restrict contact of the processing composition to the picture area and also confine the transfer image thereto. It is necessary to temporarily bond or adhere this mask to the surface of the image-receiving sheet so that the image-receiving sheet may be displaced from the mask in providing the finished print. At the same time, the bond between the mask and the image-receiving sheet must have a sufficient strength to hold the mask on the sheet during handling, storage and use of the film.

The present invention is directed to framing means in the form of a mask and to an improved process particularly adapted to provide a bond for securing the mask to the image-receiving sheet.

With reference to the drawings, FIGS. 1 and 2 diagrammatically illustrate image-receptive material in the form of a flexible image-receiving sheet or layer or photoinsensitive film 10 which may comprise an image-receiving layer or sheet material 11, carried on a conventional support 12, ready for processing in conjunction with an exposed silver halide photosensitive sheet material or film 13 which, in turn, comprises an emulsion layer 14 carried on conventional film base 15. A picture frame portion of the film 13 is assumed to have been exposed to a subject in suitable camera apparatus and FIG. 1 includes a pair of pressure rolls 16 used in camera apparatus for processing of the unit.

Image-receptive element 10 and photosensitive film 11, as shown in FIG. 1, are in roll form although it will be appreciated that the invention may be carried out with cut film or film packs, as shown in FIG. 2 and further described hereinafter. A camera for use with roll film of the type illustrated is described in U.S. Pat. No. 2,455,111, issued to Joseph F. Carbone and Murry N. Fairbank on Nov. 30, 1948.

Roll film, such as that illustrated, has a plurality of picture frame portions extending successively and substantially from end to end thereof. In image-receptive element 10, each picture frame portion has a removable print section 17 lying within the confines thereof and defined by perforations 18, which extend through element 10 and which permit each removable print section 17 to be removed from the image-receiving element.

To facilitate removal of each print section 17 positive film element 10 may be provided with a tear-out or thumb hole 19 located adjacent the leading edge of the removable print section, i.e., the transverse edge of a print section which first passes between the rolls 16 during processing. In the embodiment illustrated in FIG. 1, perforations 18 are provided in the shape of curved lines adapted to provide a deckle and are arranged to enclose a rectangularly shaped area. Adjacent the leading transverse edge of the deckled portion, straight-line perforations 20 are formed in the sheet 10 and extend from each corner of the deckle towards the tear-out hole 19. The thumb hole 19 and straight-line perforations 20 are arranged and designed to assist removal of their associated print section 17.

Each removable print section 17 is adapted to have a picture area which lies inside of the margins or boundaries thereof as defined by the perforations 18 and within which the transfer image is adapted to be confined. To provide this picture area, a mask or frame 21 of a preferably flexible sheet material, which has a length substantially equal to the image-receiving element 10 and which is provided with an aperture for each removable print section 17 of element 10, is superposed on the front or image-receiving surface of said film with each aperture in registered relation to a print section 17, and is secured as described hereinafter to image-receiving layer 11. Apertures and the mask 21, the edges of one of which is indicated in FIG. 1 by reference numeral 22, are equal in number to the picture frame portions provided on the image-receiving sheet and extend lengthwise of the masking sheet 21, in spaced relation, so that the apertures are separated center-to-center by a distance equal to the length of a picture frame portion. These apertures each have dimensions substantially equal to a picture area for the transfer image and consequently the edges 22 thereof will be within the boundaries 18 of each removable print section. Mask 21 preferably has an overall width slightly less than the width of the image-receiving element 10.

FIG. 2 details photographic film units particularly adapted for employment in a photographic film pack or film magazine of the type shown in U.S. Pat. No. 3,080,- 805, issued to Joel A. Hamilton on Mar. 12, 1963.

Film units, such as that illustrated in FIG. 2, possess attached to the leading edge of photosensitive sheet 13, a leader sheet 23 having a first section 24 at which leader sheet 23 is coupled with the photosensitive sheet. First section 24 is approximately equal in width to the photosensitive sheet and provides means for mounting rupturable container 25 of the processing fluid. Leader sheet 23 also includes a tapered end section 26. Image-receptive sheet 10 is mounted on mask sheet 21 having an intermediate section 27 approximately equal in width to image-receiving sheet 10 and having a generally rectangular opening 28 therein defining the area of the image-receiving sheet in which image formation occurs. Image-receiving sheet 10 is secured to intermediate section 27, according to the procedure detailed hereinafter, so that the portions of the intermediate section bordering on opening 28 provide a mask for defining the image area and cooperation in the spreading of the processing fluid. Side guides 29 are secured to the lateral edges of mask sheet 21 and extend the length of image-receiving sheet 10 whereby to provide a gap between sheet 10 and sheet 13 and retention of the processing fluid intermediate side guides 29, upon formation of the laminate as detailed hereinafter. Mask sheet 21 includes a leading end section 30 having a tapered end portion 31 similar to tapered end section 26 of leading end section 23. Tapered end section 26 and end portion 31 cooperate to define the leading end section of the film unit which is advanced between pressure rolls 16.

The length of leader sheet 23 between the leading edge of photosensitive sheet 12 and the point of attachment of the leader sheet to mask sheet 21 is substantially equal to the length of mask sheet 21 between its point of attachment to the leader sheet and the leading edge of image-receiving sheet 10. By virtue of this arrangement, the photosensitive and image-receiving sheets are superposed in registered relationship during the processing of the film unit.

A trailer sheet 32 is provided attached to the trailing edge of photosensitive sheet 13, substantially equal to the length mask sheet 21 extends beyond the trailing ends of the registered photosensitive and image-receiving sheets, so as to trap any excess processing fluid which may be carried beyond the trailing edges of the registered sheets during distribution of the fluid processing composition.

For the purpose of withdrawing the film unit from a film pack container with photosensitive sheet 13 in superposition with print-receiving sheet 10 and advancing tapered end sections 26 and 31 between pressure rolls 16, a relatively narrow elongated leader 33 is secured at the trailing end of the leader to tapered end section 26 intermediate first section 24 and the leading point of attachment of tapered end section 26 and tapered end portion 31.

As illustrated, container 25 is mounted on first section 24 of leader sheet 23 with its longitudinal marginal seal (not shown) directed toward the leading edge of photosensitive sheet 13. Bib sheet 34 is secured to leader sheet 23 at lateral edges 35 and 36, center area 37, and to lateral edge 38 of container 25, and facilitates restricted unidirectional flow of the fluid contents of container 25 upon its rupture by compressive pressure upon passage through rolls 16.

Preferred paper base materials for the mask 21 comprise glassine, pouch, condenser papers, high-porosity rope fiber paper, and heat-conductive paper base stock, preferably having a thickness of from 0.001 of an inch to 0.003 of an inch, which may retain on its contact surface a heat-sealable, thermoplastic polymeric composition for thermal bonding of the mask to image-receiving element layer 11. However, it must be noted that synthetic materials, as for example, regenerated cellulose or cellophane or a thin polyester sheet, as for example, Mylar (registered trademark of E. I. du Pont de Nemours & Co., Wilmington, Del., for a film of polyethylene terephthalate resin), preferably having a thickness of approximately 0.008 of an inch, may comprise advantageous masking materials especially where it is desired that the laminate thickness be decreased and an edge tear strength in excess of that obtained by conventional paper based masking materials be afforded. Such characteristics are especially desirable in pressure stripping methods. Other flexible sheet materials may be employed to provide mask 21 and will be subsequently set forth.

Layer 11 of image-receiving element 10 may also or exclusively comprise a heat-sealable thermoplastic polymeric material, which does not deleteriously affect the photographic properties of that layer, or of the film unit itself, for thermal bonding to mask 21. A wide choice of such thermoplastic materials is available from the fields of both synthetic thermoplastic organic polymers and the naturally occurring thermoplastic organic polymers.

As examples of heat-sealing thermoplastic materials, the bond formed from which may be selectively released by moisture penetration, and thus comprise materials particularly suitable for use in the practice of the present invention, mention may be made of:

Nylon, e.g., N-methoxymethyl polyhexamethylene adipamide
Polyvinyl pyridine
Polyvinyl pyrrolidone
Polyvinylmethylether
Dimethyl hydantoin formaldehyde resin
Polyvinylmethylether maleic anhydride
Polyvinyl acetate Where desired, layer 11 will also contain various photographic agents and reagents, as for example, silver precipitating nuclei, oxidizing agents, etc., as well as various chemical image-enhancing agents, according to procedures known to the art.

It must be recognized that, where desired, an image-receiving layer may be employed which exhibits a tensile strength sufficient to provide an integral single-layer element exhibiting sufficient internal support as to be effectively employed and thus obviate the necessity of one or more separate supporting layers, as illustrated in the drawing.

As has been disclosed in U.S. Pats. Nos. 2,563,387, issued Aug. 7, 1951; 2,612,450, issued Sept. 30, 1952; 2,627,460, issued Feb. 3, 1953; 2,653,530, issued Sept. 29, 1953; 2,659,673, issued Nov. 17, 1953; and the like, mask 21 may be bonded or sealed to thermoplastic layer 11 by thermal activation, for example, heat sealing carried out by the use of a heated platen having a width dimension somewhat greater than the masking sheet and a length dimension approximating the length of the picture frame portion. For example, the image-receiving sheet with the mask superposed thereon in registered relation may be placed on a flat support and the heated platen is pressed into the outer surface of the mask 21. Thermal activation may be accomplished, for example, by means of a contact, infrared and/or dielectric heating source, supplying sufficient thermal energy to at least temporarily raise the temperature of the materials to be sealed for at least the time necessary to effect lamination of mask 21 to image-receiving element layer 11. Mask 21 may be registered upon image-receiving layer 11 prior to, during or subsequent to the thermal activation of either or both materials.

The degree of adhesive bonding capacity exhibited by the layer 11 and mask 21, upon appropriate thermal sealing, may be controlled by variance of the stratum 11 and/or mask 21 and/or the thermoplastic composition of either or both, as for example, by the addition of or the variance of a plasticizer content of either or both. It must be recognized that the choice of plasticizer and the amount thereof added as an adjunct to either layer 11 or mask 21 will be dependent upon the desired adhesive capacity as well as the compositions forming the elements to be heat sealed.

Heat sealing of mask 21 to image-receiving layer 11 will result in a substantially complete and uniform bonding of the apposed strata possessing sufficient strength to hold mask 21 flat and smooth on the surface of the image-receiving layer 11 during the manufacture, storage and use of the product until such time as mask 21 and image-receiving sheet 10 are to be separated.

The preferred heat seal exhibits at least in part wet strength failure upon contact of said bond with a liquid, that is, a linear reduction of the adhesive force according to the degree of liquid permeation. It is especially desirable that the aforementioned bond be one in which substantially complete release of the adhesive capacity between the respective mask and image-receiving strata occurs within the desired optimum photographic processing interval of approximately 10 seconds to 1 minute for diffusion transfer processes. However, where it is desired that the processing interval be increased or decreased to compensate for temperature variations, utilization of various photographic processing reagents or to permit utilization of imbibition techniques requiring a longer or shorter duration, as for example, in certain diffusion transfer color processes, the compositions chosen may be varied over a wide range to suit the requirements of the operator and may be selected such that wet strength failure of the seal occurs in substantially the time interval desired.

As previously noted, where desired, an image-receiving layer may have coated thereon a layer, which may comprise a thermal-bonding thermoplastic polymer, functioning, not directly as an image-receiving layer, but, for example, as a strip and/or protective coating to prevent adherence of the photographic processing composition to the print-receiving element and/or to provide protection of said element against abrasion and laceration. In that configuration of the present invention, thermal adhesion may be effected between such layer and the mask according to the procedures hereinafter set forth.

The aforementioned plasticizer may be coated on or disposed in either stratum 11 and/or the mask or a layer coated thereon, for example, according to any conventional method. Where it is desired to coat mask 21 with an appropriate plasticizer, and/or heat-sealable thermoplastic polymer, it is preferable to so coat prior to cutting the apertures therein. One preferred practice is to apply the plasticizer and/or thermoplastic coating by roll-coating procedures although, as previously mentioned, it may be preferable in certain instances to dispose the plasticizer within the mask and/or image-receiving stratum.

It may be particularly preferred to incorporate in the mask an agent that is an active surface plasticizer for the image-receiving stratum which by heat and pressure effects an activation of the receiving sheet surface whereby lamination thereto is facilitated. Suitable agents acting as surface plasticizers for various thermoplastic polymeric materials may include: alcohols, glycols, polyols, and/or glycerols, as for example, diethylene glycol, sorbitol, polyethylene glycol, methoxy polyethylene glycol, and/or glycerine. It is probable that the effectiveness of such is due to the transfer of the agent by means of heat and pressure from the mask to the receiving sheet surface to provide a more tacky sheet surface by means of which lamination of the mask is facilitated and improved.

It must be noted that the aforementioned adjuncts may be applied by spraying on one surface of either the mask and/or image-receiving stratum or by spreading the plasticizer compositions over a surface of said elements with a doctor blade or by moving one surface of said elements in contact with a reservoir or coating composition or by immersing the respective elements in the composition. Generally, application of such components may be carried out at usually encountered room temperatures. Where drying and curing of the plasticizer coating are facilitated by heat treatment, the respective coating element, after application of the coating thereon, may be passed through a zone of air heated to an appropriate temperature.

As examples of some of the commercially available plasticizers for various thermoplastic polymeric materials which may be included in and/or on mask and/or image-receiving stratum for the forementioned purposes, mention may be made of: dimethyl phthalate; diethyl phthalate; diphenyl phthalate; di-2-ethylhexyl phthalate; dimethyl Cellosolve phthalate; methyl phthalyl ethyl glycolate; triphenyl phosphate; tributyl phosphate; dibutyl tartrate; diamyl tartrate; camphor; acetyl triethyl citrate; triacetin; tripropionin; triethylene glycol; Santicizer 9 (trade name of Monsanto Chemical Company, St. Louis, Mo., for a mixture of ortho- and para-toluene sulfonamides), etc. It should be noted that appropriate tackifier resins may be substituted in whole or in part for the aforementioned plasticizers in the procedures set forth above. As examples of tackifier resins for this purpose, mention may be made of: polyvinyl methylether maleic anhydride, gum arabic, polyvinyl pyridine, polyvinyl pyrrolidone, rosin, etc. The use of one or more of the aforementioned compounds either singularly or in combination is subject to a wide variation in concentration to suit the requirements of the operator in regard to the time duration as well as the degree of adhesive capacity, that is, tackiness desired.

As disclosed in U.S. Pat. Nos, 2,810,933, issued Oct. 29, 1957; 2,844,731, issued July 22, 1958; 2,859,480, issued Nov. 11, 1958; 2,882,412, issued Apr. 14 1959; 2,910,723, issued Nov. 3, 1959; 2,939,956, issued June 7, 1960; 3,018,189; issued Jan. 23, 1962; 3,113,208, issued Dec. 3, 1963; 2,864,756, issued Dec. 16, 1958; 2,881,470, issued Apr. 14, 1959; 2,923,964, issued Feb. 9, 1960; 2,935,418, issued May 3, 1960; 2,969,463, issued Jan. 24, 1961; 2,991,360, issued July 4, 1961; 3,067,119, issued Dec. 4, 1962; 3,132,246, issued May 5, 1964; 3,133,193, issued May 12, 1964; 3,192,385, issued June 29, 1965; 3,196,063, issued July 20, 1965; 3,196,270, issued July 20, 1965; polymeric material and specifically polyolefines such as polyethylene may be surface treated by electrical discharge so as to render the surface of the polymeric material more readily adherent to printing materials such as inks, pigments, paints, and the like.

In general, such object is achieved by passage of the polymeric material, in web form, through a treatment station which comprises a first or treatment electrode located near the surface of the material to be treated and a second electrode, insulated from the first electrode, in contact with the opposite surface of the material. An electrical potential is applied between the electrodes to provide accumulated electrostatic charge adapted for repetitive discharge from the treating electrode, while the polymeric material is transported intermediate the electrodes, such that a surface of the material is briefly exposed to the discharge. It has been found that the discharge derived from the application of electrical potential, for example, pulsating potential, between the spaced electrodes, wherein the polymeric material is exposed to the action of energy accumulated as an electrostatic charge on the treatment electrode and discharged contiguous the surface of the material in the treatment zone, provides rapid modification of the polymeric material's surface rendering it receptive to the aforementioned printing materials. In general, it is preferred that an alternating high voltage source be employed to produce a corona discharge between the electrodes of the assembly, that is, a self-sustaining electrical discharge which does not transverse the entire distance between the electrodes but which is sustained by the electrical voltage between the electrodes, when the exterior ionizing sources are withdrawn.

The minimum electrical voltage which may be required to produce the preferred corona discharge is dependent upon a variety of factors including the distance between the electrodes, the nature of the atmosphere including temperature, pressure and humidity, and such dielectrical material as is employed to insulate the second or non-treatment electrode, as well as the frequency of the alternating potential. For a discharge in an air atmosphere, the potential greater than 50 volts per mil will ordinarily be employed. While direct current corona discharges may be employed, it is preferred that an alternating voltage between the electrodes be selected in view of the fact that it is more easily sustained. Although the frequency selected may be relatively low, for example, 60 cycles/second, greater efficiency is obtained with higher frequency discharges, the preferred frequency being in the order of about 450,000 cycles/second or higher.

The corona discharge takes place in the air space between the electrodes in such a manner that substantially the shortest air path is traversed. A suitable source of the alternating voltage electrical potential may be a high frequency, high voltage transformer fed by a spark-gap oscillatory circuit requiring very little electrical current. Commercial spark generators of various capacities are directly available from a plurality of companies including Lepel High Frequency Laboratories, Woodside, N.Y. Employment of such generators selected to discharge a voltage of about 100,000 volts may be employed with their respective electrodes spaced to provide an air gap of approximately 1 inch.

A typical electrical source for such generator consists of a low voltage alternating current source which may be the common domestic alternating current source comprising 110 volts at a 60 (or 50) c.p.s. frequency or the common industrial sources comprising 230 or 460 volts, single phase, 60 (or 50) c.p.s. The voltage from such source is generally fed into an iron core, high resistance, current limited transformer which increases the voltage to a value in the order of several thousand volts. The secondary circuit of such transformer generally contains an adjustable spark gap, a capacitor, and the primary circuit of a high frequency, high voltage transformer, which may be a Tesla coil, or the like. The high frequency, high voltage electrical charge is directly provided by the secondary circuit of the high voltage transformer to the output terminals of the electrodes for producing the desired corona discharge.

It has now been unexpectedly discovered that if the mask and/or image-receiving layer to which it is to be heat sealed is subjected to the aforementioned electrostatic discharge then the elements may be heat sealed at a lower temperature than that required in the absence of such discharge, to provide a bond exhibiting the same adhesive capacity, thus decreasing thermal degradation of the components, especially thermal degradation of the image-receiving element's components, during fabrication of the masked image-receiving sheet.

As shown in FIG. 3, for the purpose of illustration, the masked image-receiving element may be fabricated in accordance with the schematic process there detailed. As shown, a web 39 of masking material which may comprise, for example, a paper stratum 40 optionally coated with a thermoplastic polymeric stratum 41 is continuously transported from supply roll 42 through electrostatic charge treatment station 43 by conventional motive means not shown.

During passage of web 39 through station 43, the web is subjected to surface treatment by contact with corona discharge 44. Treatment station 43 may comprise the illustrated combination of electrodes 45 and 46, and web 39 is transported and guided intermediate the electrodes, by positioning rolls 58 and electrode 46, with the surface to be treated, for example, surface 47, of thermoplastic layer 41, directed toward, but separated from treatment electrode 45 by a distance which provides an air gap of about 1 inch. Paper layer 40 of web 39 is transported over freely rotating roll electrode 46 in contact with the exposed surface of the dielectric coating 48 carried on the surface of electrode 46. The desired high frequency, high voltage, low current discharge source 59 may be supplied from and by a commercially available generator, for example, of the type previously described.

Subsequent to treatment, web 39 may be transported through appropriate cutting dies 49 and 50 to provide to the web the geometrical masking configuration aperture desired, for example, one of those previously discussed.

Masking web 39 may then be brought into face-to-face contact with an image-receiving web 51, comprising support 52 and image-receptive stratum 53, from supply roll 54, at positioning rolls 60, and is thermally sealed to the image-receiving web by pressure apposition of platens 55 and 56; platen 55 having the geometry previously discussed and possessing the temperature required to heat seal the respective webs together.

The resultant laminate may then be rolled on a take-up roll 57 for later employment in the fabrication of film units of the type previously described or, alternatively, directly employed in the fabrication of such film units.

The invention will be illustrated in greater detail in conjunction with the following specific example which sets out a representative process for framing an image-receiving element which has been determined to be especially useful in the practice of this invention, which example, however, is not limited to the details therein set forth and is intended to be illustrative only.

EXAMPLE

A web comprising a paper base 0.0015 of an inch in thickness coated with a 3% glycerine solution was treated as detailed in FIG. 3 by subjecting the coating to a corona discharge of 100 kv. derived from a Lepel Model HFSG-2 Generator at a frequency of 450k c.p.s. and a rate of approximately 1000 sq. ft. per minute.

The required apertures were then cut in the web and the web thermally sealed at 260° F. and 50 lbs. per sq. in. (gauge pressure) to the image-receiving layer of a print-receiving web comprising a cellulose nitrate subcoated baryta paper carrying, in succession, a layer comprising the partial butyl ester of polyethylene/maleic anhydride copolymer, prepared by refluxing, for 14 hours, 300 grams of high viscosity poly(ethylene/maleic anhydride), 140 grams of n-butyl alcohol and 1 cc. of 85% phosphoric acid, approximately 0.75 mils thick; a layer of polyvinyl alcohol approximately 0.3 mils thick; and a layer of polyvinyl alcohol and poly-4-vinylpyridine 2:1 approximately 0.40 mil thick.

Repetition of the procedure disclosed in the above-stated example, except for the electrostatic discharge treatment, utilizing approximately the same sealing temperature and pressure and webs of approximately the same gauge failed to provide a seal between the mask and the image-receiving element. In order to provide a masked image-receiving element exhibiting substantially identical adhesion and release properties as exhibited by the fabricated elements of the example, in the absence of the electrostatic discharge treatment, it was necessary to disadvantageously increase the sealing temperature to 325° F.

The last-mentioned electrostatic treatment procedure was repeated utilizing a mask sheet which comprised 0.1 mil paper base carrying an 0.2 mil coating of polyvinyl acetate and a mask sheet which comprised 0.1 mil paper base carrying an 0.2 mil coating of ethyl cellulose plasticized with castor oil and image-receiving elements of the type commercially sold by Polaroid Corporation, Cambridge, Mass., as a component of Type 107 photographic film, with substantially identical results.

Repetition of the above-mentioned procedures employing the stated electrostatic discharge treatment provides in each instance adhesion of the respective mask to the image-receiving element at a substantially lower temperature than that possible in the absence of such treatment.

The previously mentioned fluid photographic processing composition for forming a transfer image may, for example, comprise any of those described in the appropriate above-identified patents. A rupturable container 25, adapted to releasably hold a liquid photographic processing composition, is associated with each picture frame portion of the positive film or print-receiving element 18, and containers of this character are shown as mounted on the outer surface of the mask sheet 21 in FIG. 1 and that of element 13 in FIG. 2 to extend transversely adjacent to the leading edge of each picture frame portion thereof. These containers are made of a flexible, substantially liquid-impermeable sheet material which is folded over on itself and sealed at its ends and along the adjacent long edges thereof which are brought together by folding. Complete sealing of the containers takes place after they are filled. Containers 25 are secured in their mounted position by suitable adhesive means. The long edge seal of each container forms the trailing edge and is designed so that when the elements 10 and 13 are pulled through the rollers 16, hydraulic pressure will rupture the container at this long seal to cause its contents to be discharged therefrom for spreading over the surface of the image-receiving sheet.

While the containers 25 and liquid processing composition per se, beyond supplying a convenient means of dispensing the moisture necessary in the preferred embodiment to effectuate a decrease in the exhibited adhesive force of the bond, are not a part of the present invention, illustration thereof has been made to facilitate understanding the invention and especially the manner in which the image-receiving element is stripped from its bond with the mask.

It necessarily follows from the nature of the invention herein disclosed that the processing composition may be modified over a wide range to suit the requirements of the operator to provide, in the preferred embodiment, a moisture content from the aqueous and/or organic solvent, etc., sufficient to cause wet strength failure of the adhesive bond within the desired time interval upon contact of said bond with said processing composition.

It is to be understood that in carrying out the process of this invention, dispensing the moisture desired to effectuate a decrease in the exhibited adhesive force of the bond may, where desired, be accomplished, for example, by immersing, coating, spraying, flowing, etc., and the photosensitive element superposed, prior to, during or after wetting, on a sheetlike support element, which may be utilized as a print-receiving element.

In the use of the novel product of the invention, the photosensitive emulsion 14 of the negative film 13 is suitably exposed in a camera. The exposed area of the photosensitive layer and print section of the positive film 10, which corresponds to the exposed picture frame portion of the negative film 13, are simultaneously advanced as by pulling the ends of the films between the pressure rolls 16. As a result, sufficient hydraulic pressure is created within the container, associated with said picture frame portion, by rolls 16 to rupture the long edge seal and forcibly discharge processing composition 59 from the trailing edge of the container. Continued movement of the two layers causes the released liquid to be spread in a uniform thin layer in contact with the print aperture of the liquid-permeable moisture-releasable bond between the image-receiving and the photosensitive sheet materials 10 and 13 which are brought into superposed relation as they pass between rolls. This layer of spread processing liquid 59 is shown in FIG. 5. Liquid spread outside of the picture area of the print section 17 or 28 is adapted to be trapped by appropriate trapping means (not shown).

In roll film of the type depicted in FIG. 1, movement of the two sheets through the rolls 16 is arrested after a picture frame portion has been pulled therethrough and the superposed sheets 10 and 13 in laminated condition, resulting from the action of the pressure rolls, are allowed to remain in the dark for about one minute. A door provided in the camera may then be opened and the processed print section can be removed by manual detachment, for example by inserting a fingernail through the aperture 19 and tearing the image-carrying layer along the perforations 18 and 20.

It should be pointed out, in connection with the diagrammatic representation of FIG. 5, that the layer of spread liquid, both during and after the photographic processing, dries rapidly to form a thin film. Thus, when imbibition time has been completed and the removable print section is ready to be pulled from the print-receiving element, the film formed by the spread liquid is considerably thinner than shown, although it is not completely dry within a minute of spreading. Drying is completed by evaporation of the water from the surface of the composition which is exposed as a result of removal of the print. The film formed by the spread liquid is shown in FIG. 5 as adhered to the emulsion layer of the negative photosensitive element when the image-receiving sheet is stripped from the composite film, although it will be understood that the film formed by the spread liquid may be caused to adhere to the image-receiving sheet upon stripping.

While in the foregoing specification specific structures and steps have been set forth in considerable detail for the purpose of illustrating the preferred embodiments of the invention, it will be readily understood that such details of structure and process may be varied widely by those skilled in the art to provide for the fabrication of a laminate, by a process which includes the steps of subjecting a sheet element to an electrical discharge, prior to thermal sealing of that sheet element in superposed relation to a second sheet element without departing from the substance of the invention set forth.

Since certain changes may be made in the above prodduct and process without departing from the scope of the invention herein involved, it is intended that all matter contained in the above description or shown in the accompanying drawings shall be interpreted as illustrative and not in a limiting sense.

What is claimed is:

1. In a process for the fabrication of a laminate which comprises the step of thermally sealing a first sheet in superposed relationship to a second sheet wherein the contact surface of said first sheet comprises paper, the contact surface of said second sheet comprises a thermoplastic material, the improvement which comprises the step of subjecting said contact surface of said first sheet to an electrical discharge prior to said thermal sealing of said sheets.

2. A process as defined in claim 1, wherein said first sheet is thermally sealable to said second sheet at a first temperature in the absence of said step of subjecting said thermoplastic material to said electrical discharge and is thermally sealable at a second temperature less than said first temperature subsequent to said step of subjecting said sheet to said electrical discharge and said thermal sealing is conducted at said second temperature.

3. A process as defined in claim 1, wherein said electrical discharge is a corona discharge.

4. A process as defined in claim 1, wherein each of said first and said second sheets is flexible.

5. A process as defined in claim 1, wherein said thermoplastic material comprises polyvinyl alcohol.

6. A process as defined in claim 9, wherein said electrical discharge is a corona discharge.

7. A process as defined in claim 9, wherein said thermoplastic material is polyvinyl alcohol coated on the contact surface of said image-receiving sheet.

8. A process as defined in claim 9, wherein said mask sheet is thermally sealable to said image-receiving sheet at a first temperature in the absence of said step of subjecting said thermoplastic material to said electrical discharge and is thermally sealable at a second temperature less than said first temperature subsequent to said step of subjecting said mask to said electrical discharge and said thermal sealing is conducted at said second temperature.

9. In a process for the fabrication of a photographic product which comprises the step of thermally sealing a flexible mask sheet in superposed relation to the image-receptive surface of a flexible image-receiving sheet for receiving a photographic transfer image by diffusion transfer processing wherein said mask possesses at least one aperture therein which defines the image-receptive area of said image-receiving sheet when said mask is superposed thereon and the contact surface of said image-receiving sheet comprises a thermoplastic material and the contact surface of said mask comprises paper, the improvement which comprises the step of subjecting the contact surface of said mask to an electrical discharge prior to thermally sealing said mask sheet to said image-receiving sheet.

References Cited

UNITED STATES PATENTS

| | | | |
|---|---|---|---|
| 2,859,480 | 11/1958 | Berthold et al. | 156—272 X |
| 2,867,912 | 1/1959 | Kritchever | 156—272 X |
| 2,876,358 | 3/1959 | Root | 156—272 X |
| 2,881,470 | 4/1959 | Berthold et al. | 156—272 X |
| 2,923,964 | 2/1960 | Plonsky | 156—272 X |
| 3,081,214 | 3/1963 | Strome | 156—272 |
| 3,159,520 | 12/1964 | Harrison et al. | 156—272 |
| 3,318,758 | 5/1967 | Tell | 156—272 X |
| 3,323,965 | 6/1967 | Hanle et al. | 156—272 X |
| 3,350,247 | 10/1967 | Steinberg | 156—272 X |
| 3,391,044 | 7/1968 | Kaghan et al. | 156—272 |

BENJAMIN R. PADGETT, Primary Examiner

S. J. LECHERT, Assistant Examiner

U.S. Cl. X.R.

96—68; 161—270